No. 696,690.  
J. E. MURRAY.  
EDUCATIONAL DEVICE.  
(Application filed Aug. 9, 1901.)  
Patented Apr. 1, 1902.
(No Model.)
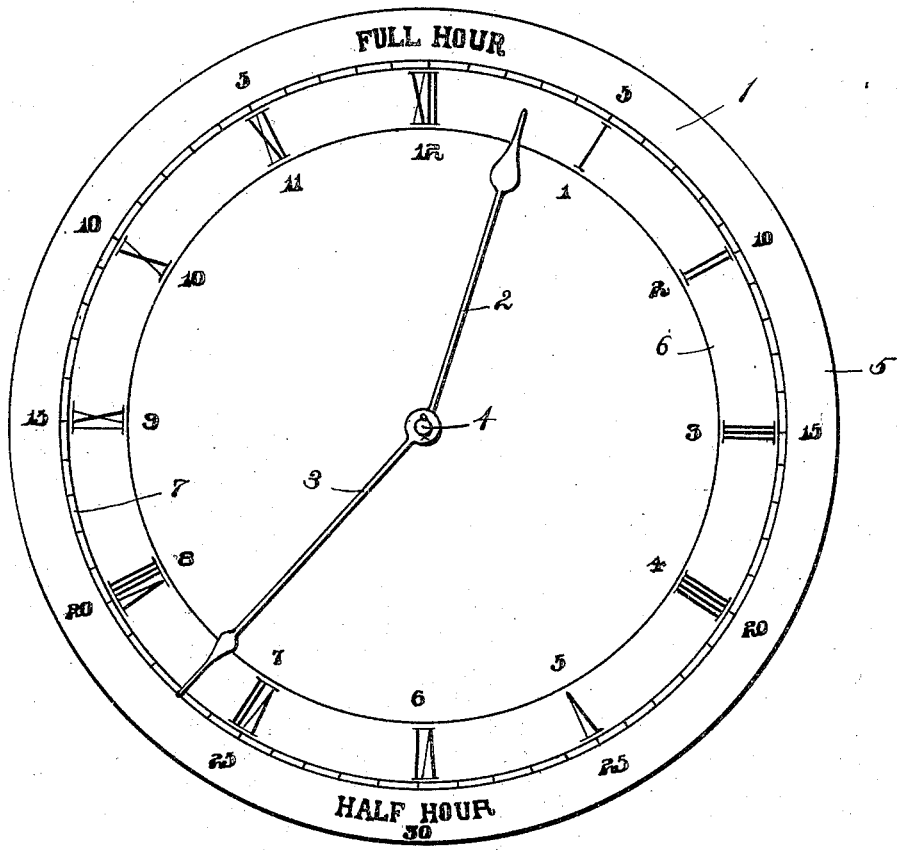
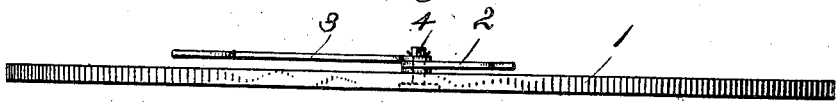

UNITED STATES PATENT OFFICE.

JOHN E. MURRAY, OF WASHINGTON, PENNSYLVANIA.

EDUCATIONAL DEVICE.

SPECIFICATION forming part of Letters Patent No. 696,690, dated April 1, 1902.

Application filed August 9, 1901. Serial No. 71,452. (No model.)

*To all whom it may concern:*

Be it known that I, JOHN E. MURRAY, a citizen of the United States of America, residing at Washington, in the county of Washington and State of Pennsylvania, have invented certain new and useful Improvements in Educational Devices, of which the following is a specification, reference being had therein to the accompanying drawings.

This invention relates to certain new and useful improvements in educational devices, and has for its object the provision of novel means whereby the dial of a clock may be easily read and the different times of the day illustrated.

The present invention has for its further object to provide a dial with certain numerals placed thereon that will greatly aid children to familiarize themselves with the hours of the day.

With the above and other objects in view the invention consists in the novel combination and arrangement of parts to be hereinafter more fully described, and specifically pointed out in the claim.

In describing the invention in detail reference is had to the accompanying drawings, forming a part of this specification, and wherein like numerals of reference indicate corresponding parts throughout the views, in which—

Figure 1 is a plan view of my improved educational device. Fig. 2 is a side elevation thereof.

In the drawings the reference-numeral 1 indicates the dial, 2 indicates the hour-hand, and 3 indicates the minute-hand, which hands are pivotally connected centrally, as at 4.

The reference-numeral 5 represents an outer margin, and 6 indicates an inner margin. In the inner margin are arranged Roman numerals from "1" to "12," representing the hours, and above said numerals are graduations (indicated by the reference-numeral 7) representing the minutes. In the outer margin are arranged the numerals "5," "10," "15," "20," "25," and "30" on each side, and in the inner circle are arranged the numeral from "1" to "12," corresponding with the Roman characters. On the outer margin, at the upper portion of the dial, are placed the words "Full Hour," and at the corresponding lower portion are arranged the words "Half hour."

It will be noted that by a dial such as shown and described it will be an easy matter to teach and instruct children the different times of the day. This invention is particularly adapted to be used in the kindergarten and in the primary grade of schools.

The many advantages obtained by the use of my improved device will be readily apparent from the foregoing description, taken in connection with the accompanying drawings.

It will be noted that various changes may be made in the details of construction without departing from the general spirit of my invention.

Having fully described my invention, what I claim as new, and desire to secure by Letters Patent, is—

An educational device comprising in its entirety, a flat circular disk having an hour-hand and a minute-hand centrally and movably mounted thereon, an inner and outer margin on said disk divided by circular lines, Roman characters arranged on said inner margin the inner margin having arranged beneath each Roman character its Arabic equivalent for the hour-hand, and the outer margin having arranged above each Roman character its equivalent in Arabic numerals for the minute-hand, and the words "Full hour" and "Half hour" arranged on the outer margin above the Roman characters "XII" and below the Roman characters "VI," the said hour-hand and minute-hand adapted to be revolved by the hand of the instructor whereby different hours and minutes may be readily indicated for the instruction of the pupil, substantially as described.

In testimony whereof I affix my signature in the presence of two witnesses.

JOHN E. MURRAY.

Witnesses:
 MARGARET M. HART,
 W. A. H. MCILVAINE.